United States Patent [19]

Morita

[11] Patent Number: 4,825,196

[45] Date of Patent: Apr. 25, 1989

[54] SIGNAL TRANSMISSION CIRCUIT OF FIRE/SECURITY PROTECTION SYSTEM

[75] Inventor: Toshikazu Morita, Tokyo, Japan

[73] Assignee: Nohmi Bosai Kogyo Kabushiki Kaisha, Tokyo, Japan

[21] Appl. No.: 141,662

[22] PCT Filed: Sep. 2, 1987

[86] PCT No.: PCT/JP87/00655

§ 371 Date: Dec. 4, 1987

§ 102(e) Date: Dec. 4, 1987

[87] PCT Pub. No.: WO88/02160

PCT Pub. Date: Mar. 24, 1988

[30] Foreign Application Priority Data

Sep. 9, 1986 [JP] Japan ................................ 61/13554

[51] Int. Cl.⁴ .......................... G08B 1/00; H04Q 1/30

[52] U.S. Cl. .................................... 340/531; 340/505; 340/309.15; 340/825.07

[58] Field of Search ............... 340/531, 505, 506, 539, 340/533, 537, 538, 309.15, 310 R, 825.54, 825.06–825.12, 518

[56] References Cited

U.S. PATENT DOCUMENTS 4,550,311 10/1985 Galloway et al. ................. 340/506

FOREIGN PATENT DOCUMENTS 50-86942 7/1975 Japan .
52-25993 2/1977 Japan .
52-113199 9/1977 Japan .
59-108680 5/1984 Japan .

*Primary Examiner*—Donnie L. Crosland
*Attorney, Agent, or Firm*—Wenderoth, Lind & Ponack

[57] ABSTRACT

A signal transmission circuit provided with a control panel or a terminal device of a fire/security protection system is arranged so as to transmit a signal from the control panel or terminal device to a signal line. The signal transmission circuit includes: a signal transmission which is enabled when transmitting a signal under the control of a signal processing portion; a signal detector for detecting the signal transmitted from the signal transmitter to the signal line; a timer which is set when the signal is transmitted and is reset by the detection output from the signal detector, and a signal transmission controller for turning off the signal transmitter when the time count output of the timer exists during a predetermined time interval.

4 Claims, 3 Drawing Sheets

SIGNAL TRANSMISSION CIRCUIT OF FIRE/SECURITY PROTECTION SYSTEM

TECHNICAL FIELD

The present invention relates to a signal transmission circuit of a fire/security protection system, and more particularly, it relates to a signal transmission circuit of a fire/security protection system which transmits a signal from a signal processing portion provided in a control panel or terminal device of the fire/security protection system and which, even when trouble occurs in said control panel and the like, still allows other slave units and the like in normal condition to transmit the signal to the signal line without being occupied by the control panel or slave unit in trouble.

BACKGROUND TECHNOLOGY

Control panels and terminal devices (e.g. slave units, fire sensors, fire detectors, intrusion detectors, fire protection means, smoke venting means, fire extinguishing means) of fire/security protection systems such as fire alarm systems and security systems are equipped with transmission circuits, and it is necessary to check if the transmission circuits have properly transmitted their predetermined signals.

The following method is considered to be suitable for this check. The signal which should be transmitted from the transmission circuit is stored in the memory circuit, and the signal which has been transmitted from said transmission circuit is received by the receiving circuit. This received signal is compared with the signal stored in the memory circuit, and if they match, it means that the transmission circuit has properly transmitted the signal.

Nevertheless, if a trouble occurs in the receiving circuit, it is not possible to detect the signal transmitted from the transmission circuit, and descrimination means such as a CPU judges that no signal has yet been transmitted from the transmission circuit. Therefore, even after the parallel-serial converter has completely sent the signal to be transmitted off to the transmission circuit, the CPU still keeps the transmission circuit in a state ready for signal transmission, and consequently the signal line remains occupied by the terminal device. Therefore, there is such a problem that the control panel or other slave units can not transmit signals to the signal line.

DISCLOSURE OF THE INVENTION

The present invention is made in view of the above circumstances and with the objective of offering a signal transmission circuit which transmits a signal from a signal processing portion provided in a control panel or terminal device of a fire/security protection system and which, even if trouble occurs in the control panel or a terminal device such as a slave unit, still allows the control panel or any other slave unit in normal condition to transmit the signal to the signal line without being occupied by the control panel ot slave unit in trouble.

The present invention has been made to achieve said object. Namely, according to the present invention, a signal transmission circuit is provided with a control panel or a terminal device of a fire/security protection system so as to transmit the signal from said control panel or terminal device to a signal line, said signal transmission circuit comprising a signal transmitting means set to any enable state when transmitting a signal under the control of said signal processing portion, a signal detecting means to detect the signal transmitted from said signal transmitting means to the signal line, a timer means which is set when the signal is transmitted and is reset by the detection output from said signal detecting means, and signal transmission control means to turn off said signal transmitting means when the time count output of said timer means is present during a predetermined time interval.

BEST MODE FOR EMBODYING THE INVENTION

Figure 1:
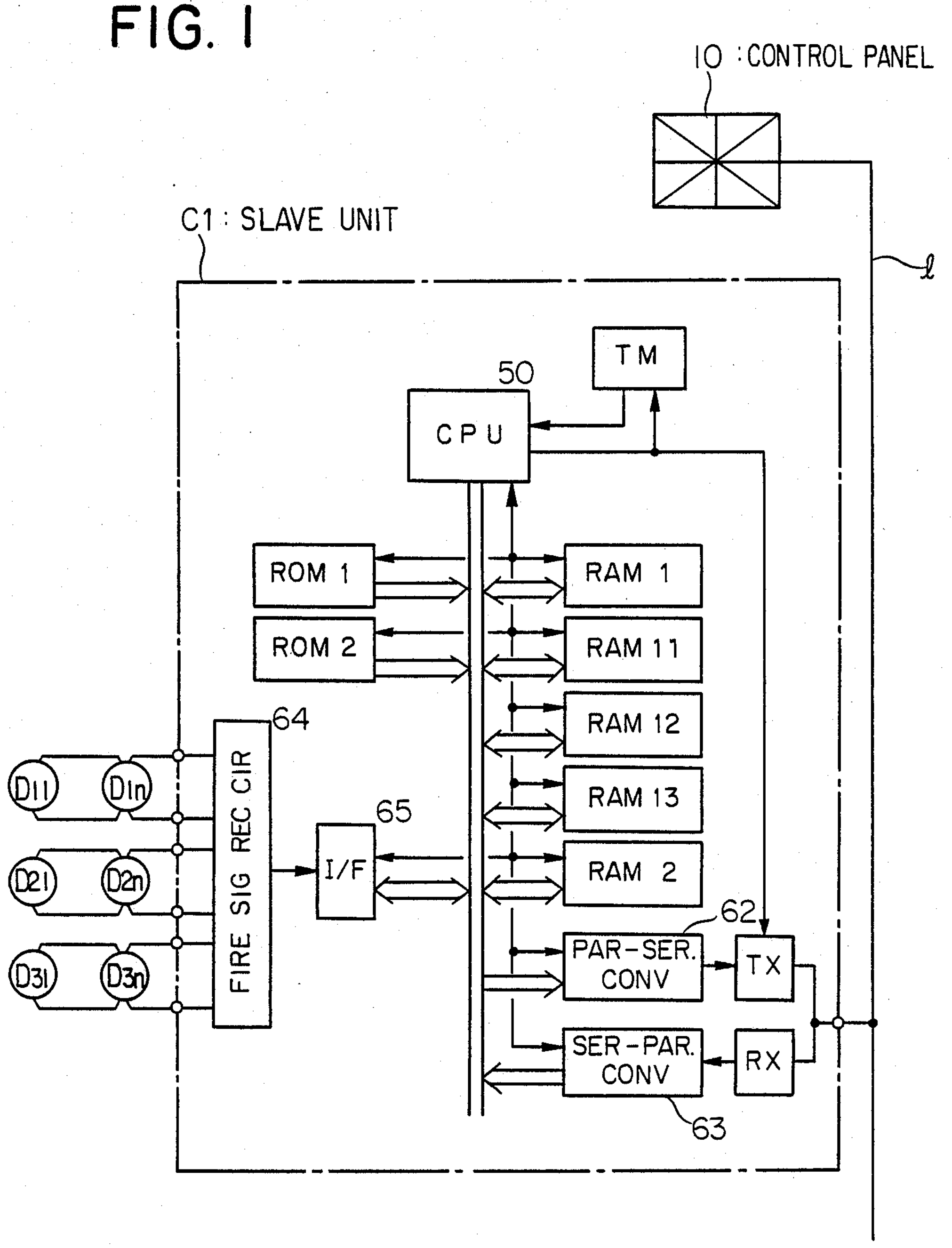
FIG. 1 is a block diagram showing an embodiment according to the present invention.

FIG. 1 is a block diagram showing the present invention embodied in a slave unit as a terminal device. The slave unit C 1 is equipped with a CPU 50, a transmission supervisory timer TM, a parallel-serial converter 62 which converts a digital parallel signal to a serial signal, a serial-parallel converter 63 which converts a digital serial signal to a parallel signal, a fire signal receiving circuit 64, an interface 65, a transmission circuit TX and a receiving circuit RX.

The slave unit C 1 is further equipped with a ROM 1 which stores the program shown with the flowchart (FIG. 3) or another program, a ROM 2 which stores the address of the relay unit C 1, a RM 1 which is used for working, a RAM 2 which stores a signal transmitted to the parallel-serial converter 62 by the CPU 50 (a signal henceforth transmitted from the slave unit C 1), RAM 11, RAM 12, RAM 13 which temporarily store signals to be transmitted to the control panel 10 or signals received from the control panel 10. The symbol l represents the signal line, and D 11 - D 1n, D 21 - D 2n, D 31 - D 3n represent fire detectors connected to the fire signal receiving circuit.

The transmission circuit TX is an example of the signal transmission means which is set to a state ready for signal transmission by control of the signal processing part (CPU 50) when transmission of the signal is desired. The transmission supervisory timer TM is an example of the timer means which is triggered at the time of signal transmission and reset by detection output of the signal detection means.

The CPU 50, receiving circuit RX and serial-parallel converter 63 are shown as an example of the signal detection means which detects the signal transmitted to the signal line l from the signal transmission means. The CPU 50 is an example of the signal output control means which switches off the signal transmission means when the given time of the transmission supervisory timer TM is reached.

Figure 2:
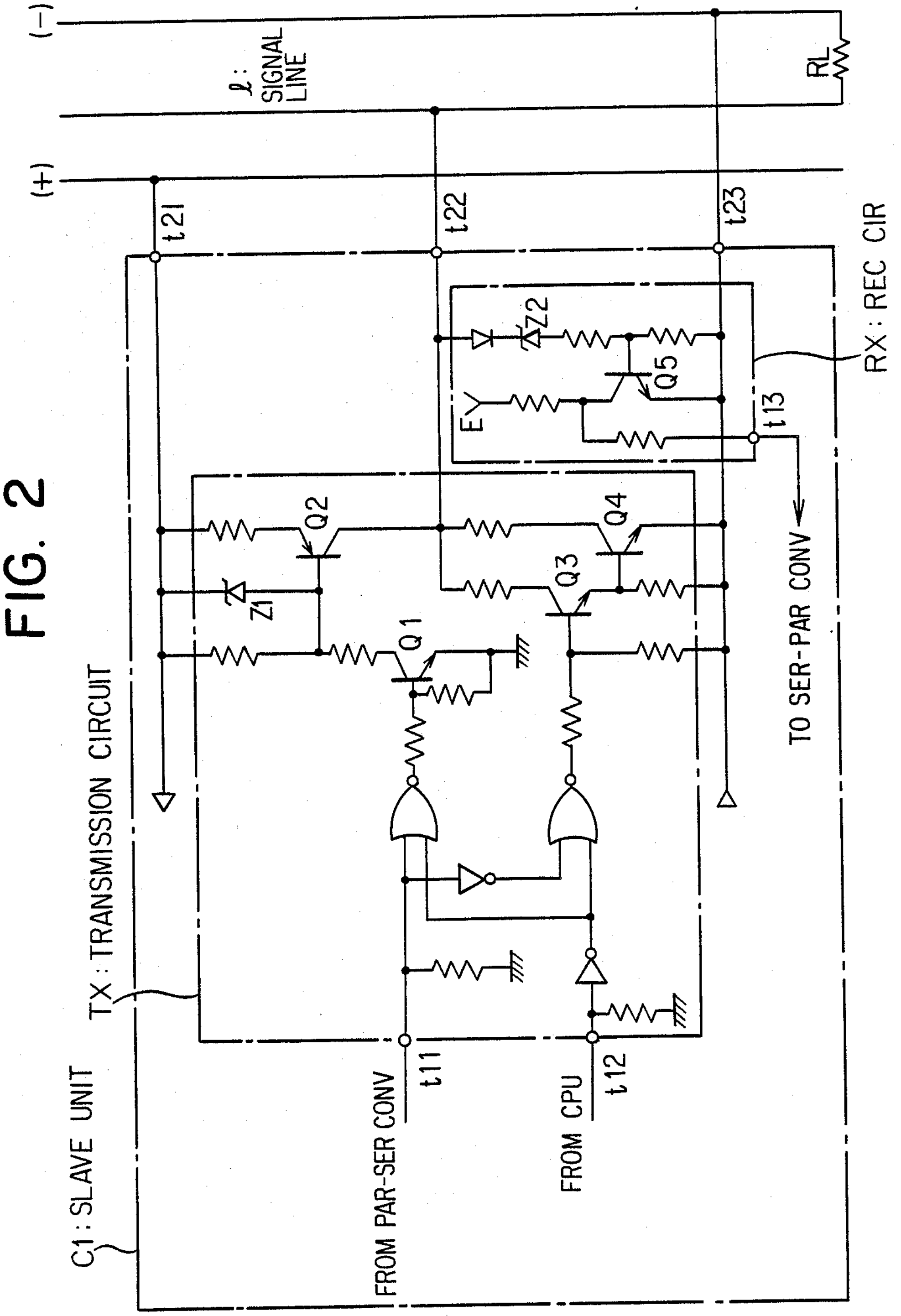
FIG. 2 is a circuit diagram showing the transmission circuit and receiving circuit shown in FIG. 1 more concretely.

FIG. 2 is a circuit diagram showing the transmission circuit TX and receiving circuit RX more concretely. The transmission circuit TX is equipped with two inverters, two NORs, transistors for phase conversion Q 1, Q 3, complementary transistors Q 2, Q 4 and a zener diode Z 1.

The transmission circuit TX is equipped with an input terminal t 11 which receives the output signal from the serial-parallel converter 63, a control terminal t 12 which receives the control signal from the CPU 50, power supply terminals t 21, t 23 and an input/output terminal t 22. If the signal transmitted from the CPU 50 to the control terminal t 12 is low (low level state signal), one of the inputs on each of the two NOR gates goes high (high level state), causing both of the transistors Q 2, Q 4 to switch off. Consequently the output impedance of the transmission circuit TX becomes infinite, thus the transmission circuit TX is effectively disconnected from the signal line l. If the signal from the CPU 50 is high (high level state signal), one of the inputs on each of the two NOR gates goes low, and the transmission circuit TX transmits the signal which is opposite to the output signal from the parallel-serial converter 62 to the signal line l.

In other words the transmission circuit TX is a sort of gate circuit which enters a non-operating state, allowing no signal to be transmitted from the parallel-serial converter 62 if the control signal from the CPU 50 is low (OFF signal), and which enters a state ready for signal transmission and reverses the signal from the parallel-serial converter 62 and transmits it only if the control signal from the CPU 50 is high (ON signal).

The receiving circuit RX is equipped with a transistor Q 5 for phase conversion and a zener diode Z 2 provided across the base of the transistor Q 5 and the signal line l.

Now, operation of the above mentioned embodiment will be described hereunder.

Figure 3:
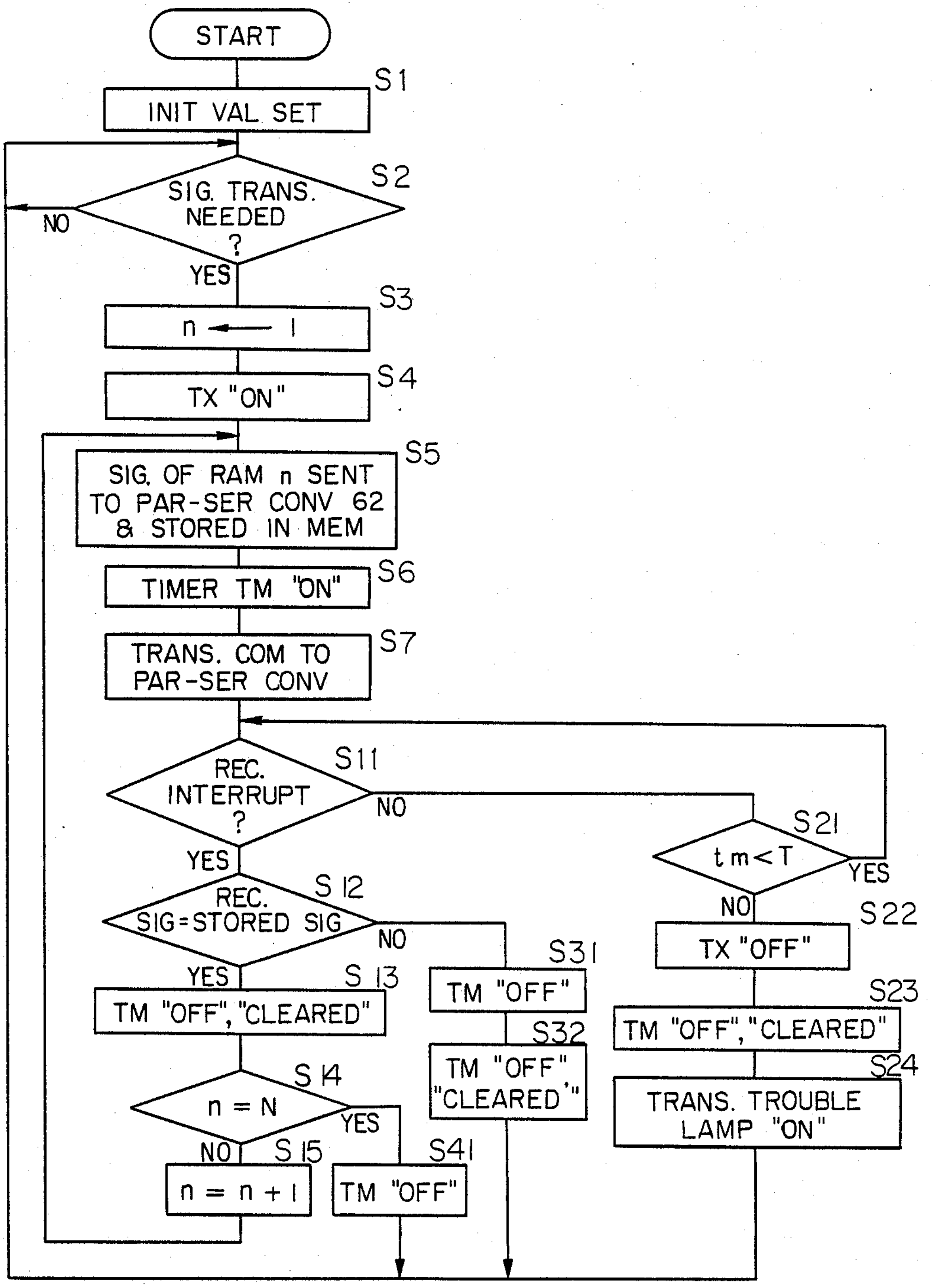
FIG. 3 is a flowchart showing the operation of the above embodiment.

FIG. 3 is a flowchart showing the operation of the embodiment.

Firstly, the initial value is set (S 1). If it is necessary to send the signal to the control panel 10 (S 2), the address n for selection of RAM 11 - RAM 13 is set to 1 (S 3), and the transmission circuit TX is set to the ON state (S 4). In other words, the CPU 50 sends the high signal to the terminal t 12 of the transmission circuit TX.

Then, the CPU 50 sends the signal stored in the RAM 11, e.g. its own address, to the parallel-serial converter 62 and causes the RAM 2 to store the signal (S 5). The CPU 50 also sets the transmission supervisory timer TM to the ON state (S 6) and sends the transmission command to the parallel-serial converter 62 (S 7). On receipt of the transmission command, the parallel-serial converter 62 transmits a serial signal, which is reversed by the transmission circuit TX and transmitted to the signal line l via the input/output terminal t 22.

The serial signal from the transmission circuit TX is detected by the receiving circuit RX and sent to the serial-parallel converter 63, from which a receive interruption is generated (S 11). If the signal sent to the serial-parallel converter 63 matches the signal stored in the RAM 2 (S 12), the transmission supervisory timer TM is set to the OFF state and cleared (S 13). And until the address n reaches the set value N, in other words until transmission of, for example, fire information code and sum check code stored in the RAM 12, RAM 13 is completed, the above mentioned operations are repeated (S 14, 15). If the address n matches the set value N, the CPU 50 transmits the low level signal to the transmission circuit TX which goes into the OFF state (S 41).

On the other hand, if there is no receive interruption at the step S 11, and the time tm elapsed from the start of the timer TM has not reached the time T set in advance with the transmission supervisory timer (S 21), the receive interruption is awaited (S 11).

If the elapsed time tm has exceeded the set time T while awaiting the receive interruption (S 21), the transmission circuit TX is set to the OFF state (S 22), because the control panel 10 or other slave units in normal condition can not transmit the signal while the transmission circuit TX is in the ON state.

More concretely, the timer TM transmits the transmission trouble signal to the CPU 50 if a given time (e.g. 0.5 second) of the timer TM has elapsed while the receiving circuit RX is receiving no signal from the transmission circuit TX. Then, the CPU 50 transmits a low level state signal to the input terminal t 12 of the transmission circuit TX, causing the transistors Q 2, Q 4 to switch off. In other words, with transmission of the low level state signal from the CPU 50 and subsequently from the NOR gate in the transmission circuit TX, the collector of the transistor Q 1 goes high, and the transistor Q 2 switches off. In this case the emitter of the transistor Q 3 goes low, thus the transistor Q 4, too, switches off. Consequently, the output impedance of the transmission circuit TX becomes high, and the transmission circuit TX is effectively disconnected from the signal line, which is now available to the control panel 10 or other slave units C 1.

After the transmission circuit TX is set to the OFF state (S 22), the CPU 50 sets the timer TM to the OFF state to clear the timer (S 23) and, if necessary, to operate the transmission trouble lamp (S 24) which indicates that the transmission circuit TX is in a troubled state.

On the other hand, if the signal transmitted from the transmission circuit TX to the signal line and received by the receiving circuit TX differs from the signal stored in the RAM 2 (S 12), it means that there is a fault in the transmission circuit TX or in the transmission system, in which case the transmission circuit TX is set to the OFF state (S 31), and the time TM is set to the OFF state and cleared (S 32).

When the signal from the transmission circuit TX is detected by the receiving circuit RX, further transmitted to the serial-parallel converter 63, and the number of its input bits reaches the predetermined bit number (e.g. 8 bits), the input signal is compared with the signal stored in RAM 2. If results of this comparison match, the timer TM is set to the OFF state and reset.

Although the above embodiment shows an arrangement for triggering the timer TM when the signal which is to be stored in the RAM 11 - RAM 13 for transmission to the control panel or slave unit is transmitted to the parallel-serial converter 62, another arrangement may be made so that the timer TM can be triggered at the time of transmitting the transmission command to the parallel-serial converter 62.

Further, the same signal as that transmitted to the parallel-serial converter 62 from one of RAM 11 - RAM 13 is stored in the RAM 2. Therefore, without providing RAM 2, the RAM 11 - RAM 13 may be used as they are in place of the RAM 2.

As described above, the present invention relates to the signal transmission circuit which transmits the signal from the signal processing portion provided in the control panel or terminal device of the fire/security protection system to the signal line and in which the timer means is triggered at the time of signal transmission and reset by detection output of the signal detection means is provided so that the signal transmission means may be set to the OFF state when the given time of the timer means is reached. Therefore, the present invention has such an effect that even if the signal line is occupied as a result of occurrence of abnormality in the control panel or one of the terminal devices, it is immediately released from the occupied state and can be used by the control panel or other terminal devices in a normal condition.

I claim:

1. A signal transmission circuit which is provided in a control panel or a terminal device of a fire/security protection system and transmits a signal from a signal processing portion to a signal line, and which is equipped with a signal transmission means which is set to a state ready for signal transmission under control of the signal processing portion when transmission is desired, a signal detection means which detects the signal transmitted from the signal transmission means to the signal line, a timer means which is triggered at the time of signal transmission and reset by output of the signal detection means, and a signal transmission control means which sets the signal transmission means to the OFF state when a given time of the timer means is reached.

2. A signal transmission circuit of a fire/security protection system as set forth in claim (1) wherein the signal transmission means is equipped with a signal transmission portion and a memory part which stores the signal sent to the signal transmission portion from the signal processing portion, and the signal detection means is equipped with a signal detection portion and a discrimination portion which generates a detection signal when the signal detected by the signal detection portion matches the signal stored in the memory portion.

3. A signal transmission circuit of a fire/security protection system as set forth in claim (1) wherein the timer means is triggered when the signal transmission means is set to a state ready for signal transmission.

4. A signal transmission circuit of a fire/security protection system as set forth in claim (1) wherein the timer means is triggered when the signal is transmitted from the signal processing part to the signal transmission means.

* * * * *